United States Patent

Inagaki et al.

Patent Number: 5,744,263
Date of Patent: Apr. 28, 1998

[54] ALKALINE STORAGE BATTERIES AND NICKEL ELECTRODES HAVING PLURALITY OF SUBSTRATES

[75] Inventors: Toru Inagaki, Kamakura; Katsuhiro Okamoto, Toyohashi; Hiroki Takeshima; Yohei Hattori, both of Fujisawa, all of Japan

[73] Assignee: Matsushita Electric Industrial Co., Ltd., Osaka, Japan

[21] Appl. No.: 754,135

[22] Filed: Nov. 22, 1996

[30] Foreign Application Priority Data

Apr. 18, 1996 [JP] Japan .................................. 8-096492

[51] Int. Cl.[6] .................................................. H01M 10/30
[52] U.S. Cl. .......................... 429/206; 429/223; 429/245
[58] Field of Search ................................. 429/223, 209, 429/241, 245, 206

[56] References Cited

U.S. PATENT DOCUMENTS 4,663,256  5/1987  Corrigan.

FOREIGN PATENT DOCUMENTS 0420669  4/1991  European Pat. Off..
850893    2/1996  Japan.

Primary Examiner—Anthony Skapars
Attorney, Agent, or Firm—Watson Cole Stevens Davis, P.L.L.C.

[57] ABSTRACT

As a nickel electrode for alkaline storage batteries, an electrode plate comprising a plurality of electroconductive substrates and a plurality of active material layers which are alternately laminated and integrated is used, whereby mutual electric conductivity of the active material and the electroconductive substrate in the direction of thickness is increased, and active material utilization, discharge voltage characteristics as batteries and charge-discharge repetition life are improved. The nickel electrode comprises a plurality of electrode leaves each of which comprises an electroconductive substrate coated with an active material and which are laminated and integrated so that the electroconductive substrate and the active material layer are alternated with each other, a plurality of said electroconductive substrates being electrically and mechanically connected through a part of the respective electroconductive substrates, said electroconductive substrate having a thickness of 5–60 μm, said active material layer coated on the electroconductive substrate having a thickness of 20–250 μm.

5 Claims, 3 Drawing Sheets

FIG.3
FIG.4
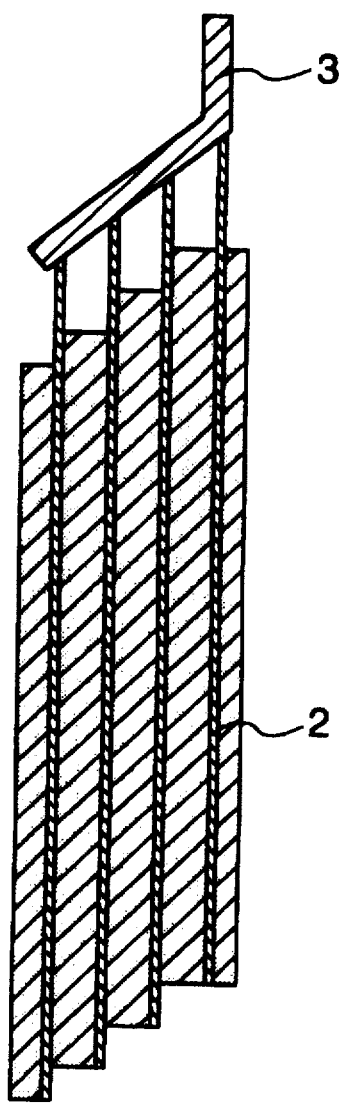
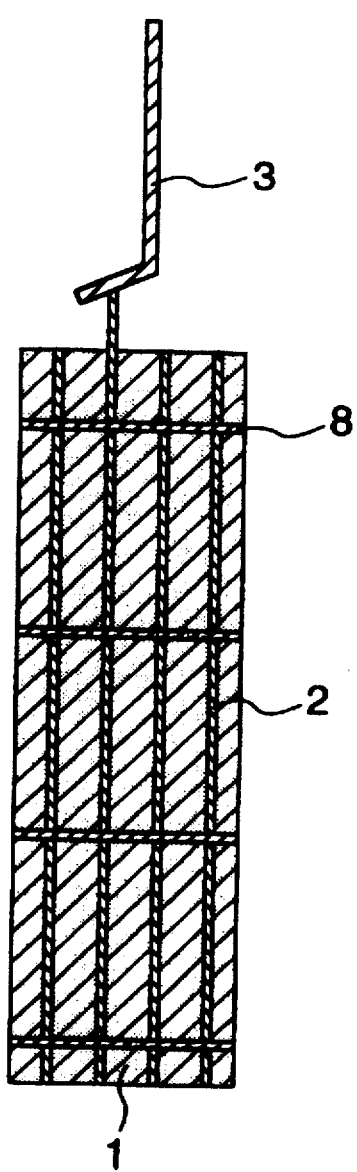

ALKALINE STORAGE BATTERIES AND NICKEL ELECTRODES HAVING PLURALITY OF SUBSTRATES

FIELD OF THE INVENTION

The present invention relates to alkaline storage batteries and a method of making nickel electrodes for the said storage batteries.

BACKGROUND OF THE INVENTION

With the recent spread of portable devices, a demand for high capacity, high performance and low cost has increased in secondary batteries including alkaline storage batteries. Therefore, foamed metal type electrodes having higher capacity density than sintered type electrodes have spread much as the nickel electrodes of alkaline storage batteries. However, the foamed metal type electrodes have the defects that the foamed metal as a substrate is expensive and remarkable improvement of capacity density is difficult owing to the structure of the foamed metal. Under the circumstances, pasted type electrodes comprising an inexpensive planar porous body as an electroconductive substrate coated with a pasted active material have been developed as a substitute for the foamed metal type electrodes.

The planar electroconductive substrates investigated as the pasted type electrodes are, for example, expanded metals, screens and punching metals. Binders to be added to the active material paste for improving the holding of the active material include, for example, polyvinyl alcohol, carboxymethylcellulose, polyethylene, polyvinyl chloride, styrene-butadiene rubbers and fluororesins.

The problems of the pasted type electrodes are insufficient contact of the active material with the electroconductive substrate and insufficient electrical conductivity because the electroconductive substrate is a planar porous body and not of the three-dimensional structure as of the foamed metal type. In order to improve the conductivity, for example, JP-A-56-22049 proposes to add a graphite powder, a nickel powder or a fiber thereof to the active material. However, when these conductive agents are added in such an amount as being able to obtain a capacity density equal to that obtained by using the foamed metal electrodes, the conductivity of the whole electrodes is insufficient, and active material utilization and discharge voltage characteristics are inferior.

As another approach, for example, JP-A-6-314567 proposes to use an electroconductive substrate having a solid form, but this electroconductive substrate is insufficient in the contact between the active material and the electroconductive substrate as compared with the electroconductive substrates having three-dimensional structure such as the foamed metal.

Therefore, unless conductive agents such as a graphite powder and a nickel powder are added, active material utilization is low and the electrodes using such electroconductive substrates are still inferior in discharge voltage characteristics and charge-discharge cycle life. Thus, such pasted electrodes have not yet been widespread.

As aforementioned, in the case of the pasted type electrode, since the electroconductive substrate is planar, the contact between the active material and the electroconductive substrate is insufficient. Particularly, since the thickness of the active material layer coated on the electroconductive substrate is more than 300 μm, the conductivity of the active material and the electroconductive substrate in the direction of thickness becomes insufficient. This is a main cause for the inferior active material utilization and discharge voltage characteristics as compared with those of foamed metal type electrodes.

If charge and discharge are repeated using these electrode plates insufficient in conductivity, sufficient discharge cannot be attained and, hence, amount of overcharging increases in charging of the next cycle. Nickel hydroxide which is an active material of nickel electrode produces nickel oxyhydroxide of low density in an increased amount when the amount of overcharge increases, and this causes swelling of the plates. On the other hand, when the electrolyte is used in a small amount with a view that the gas generated from a positive plate at the time of charging is absorbed by a negative plate as in the case of sealed batteries, the nickel plate absorbs the electrolyte in an excess amount than needed with repetition of charging and discharging due to acceleration of swelling. This causes shortage of the electrolyte in separator, which gives rise to the problems of deterioration in both the discharge voltage and the capacity.

Another problem in the pasted type electrode is that if the swelling of the plate increases, adhesion between the electroconductive substrate and the active material layer lowers, resulting in peeling off of the active material layer from the electroconductive substrate.

SUMMARY OF THE INVENTION

The main object of the present invention is to solve the above problems and improve the discharge voltage characteristics and the charge-discharge cycle life by increasing the active material utilization in pasted type nickel electrodes.

The nickel electrode of the alkaline storage batteries according to the present invention has a structure comprising a plurality of active material layers each having a thickness of 20–250 μm and a plurality of electroconductive substrates each having a thickness of 5–60 μm which are alternately laminated into an integral form, and the electroconductive substrates are electrically and mechanically connected with each other through a part of the respective electroconductive substrates. The total number of the active material layers and the electroconductive substrates is preferably 8–12.

The nickel electrode of the present invention can be obtained by laminating a plurality of electrode leaves each of which comprises the electroconductive substrate coated with the active material paste on one side or both sides with utilizing the tackiness of the paste before drying, thereby to integrate the active material layer and the electroconductive substrate, and, then, pressing the laminate to increase the adhesion between the electroconductive substrate and the active material layer with adjusting the thickness of the plate as shown in FIG. 1.

When they are simply laminated, current cannot be collected from the inner electroconductive substrates. Therefore, in order to collect a current uniformly from each of the electroconductive substrates, at least a part of the respective electroconductive substrates must be connected with each other.

For example, as shown in FIG. 2, the electroconductive substrates 2 differing in the width from each other are coated with an active material paste 1 at a constant width, and prepared electrode leaves. The electrode leaves are laminated with ends of the electrode leaves being assembled evenly and flat. The portion of the electroconductive substrates which is not coated with the active material is welded with, for example a nickel ribbon 3 or a nickel sheath to form a collector, and, thus, uniform collection of current is possible (Embodiment 1).

Alternatively, as shown in FIG. 3, the electroconductive substrates 2 having the same width are coated with an active material paste 1 at a constant width. The electrode leaves are laminated with ends of the electrode leaves being assembled in a stepped manner. The portion of the electroconductive substrates which is not coated with the active material is welded with, for example a nickel ribbon 3 or a nickel sheath to form a collector, and, thus, uniform collection of current is possible (Embodiment 2)

Furthermore, as shown in FIG. 4, small holes of 0.1–1 mm in diameter are bored through electrode leaves which include at least one electrode leaf made using an electroconductive substrate having at one end a portion coated with no active material, and a conductive paste or conductor 8 is filled into the holes to connect the electroconductive substrates with each other, and, thus, uniform collection of current is possible (Embodiment 3).

More uniform collection of current becomes possible by combining Embodiments 1 and 2 with Embodiment 3.

As for the thickness of the electroconductive substrates, less than 5 μm is not preferred because strength of the electroconductive substrate is low and the electroconductive substrates are broken when they are pressed after coated with the active material. When it is more than 60 μm, the occupying volume increases and improvement of capacity density as a battery cannot be expected.

As the electroconductive substrates, there may be used any of nickel foils, synthetic resin films coated with nickel on both sides and perforated steel sheets plated with nickel. The thickness of the nickel layer is preferably 2–5 μm, and if it is less than 2 μm, a sufficient conductivity cannot be secured and if it is more than 5 μm, the capacity density decreases. As the synthetic resin films, it is necessary to use those which are stable in an aqueous alkali solution such as, for example, polypropylene, polyethylene, nylon and polytetrafluoroethylene.

The active material and binders in which the active material is dispersed have no special limitation, and those known to one skilled in the art can be used. A conductive agents which may be added to the active material layer have no special limitation but such as metallic cobalt or cobalt oxide is preferred.

The conductive agent to be filled into the fine holes in the Embodiment 3 are also not limited, but a conductive paste mainly composed of Ni or a conductor of Ni pin is preferred.

When the structure where a plurality of the electroconductive substrates are present in one plate made by lamination of them into an integral form is employed, there may be some fear of the electrolyte in the plate being ununiformly distributed. Therefore, by making fine holes of 0.1–1 mm in diameter through the electroconductive substrates at an opening percentage of 10–60%, the electrolyte can be uniformly distributed in the plate. However, if the opening percentage exceeds 60%, strength of the electroconductive substrates lowers and, hence, there is a high possibility of the electroconductive substrates being broken when a cylindrical battery is fabricated.

BRIEF DESCRIPTION OF THE DRAWINGS

FIG. 3 is a sectional view which schematically shows the electrical connection of electrode leaves of the present invention.

FIG. 4 is a sectional view which schematically shows the electrical connection of electrode leaves of the present invention.

DESCRIPTION OF PREFERRED EMBODIMENTS

According to the invention described in claim 1 hereinafter, the nickel electrode of alkaline storage battery has a structure comprising a plurality of active material layers each having a thickness of 20–250 μm and a plurality of electroconductive substrates each having a thickness of 5–60 μm which are alternately laminated and integrated, the electroconductive substrates being electrically and mechanically connected with each other through a part of the respective electroconductive substrates.

The invention described in claim 6 given hereinafter specifies a method for making a nickel electrode. When the thickness of each of the active material layers after making a plate is 250 μm or less, the conductivity can be sufficiently secured by the addition of conductive agents such as metallic cobalt and cobalt oxide. Therefore, the nickel electrode is improved in active material utilization and discharge voltage characteristics as compared with the conventional pasted type electrodes.

Furthermore, when at least one electroconductive substrate thicker than other electroconductive substrates is used, since strength of the plate is improved, it becomes easy to fabricate a cylindrical battery and, in addition, since electrical resistance of the electroconductive substrates decreases, discharge voltage at high rate discharge increases. The constituting material of this thicker electroconductive substrate may be the same or different from that of other electroconductive substrates. The electrode leaf made using the thicker electroconductive substrate may be placed at an optional position among a plurality of the electrode leaves, but preferably is placed around the center of the electrode thickness. The thickness of the thicker electroconductive substrate is preferably 3–10 times that of other electroconductive substrates, and preferably 5–10 times when only one thicker electroconductive substrate is used.

Similarly, when fine holes of 0.1–1 mm in diameter are bored through the electroconductive substrates at an opening percentage of 0.5–2% and a conductive agent or a conductor is filled into the holes to connect the electroconductive substrates, the electrical resistance also decreases and discharge voltage at high rate discharge increases. As these holes, a part of the holes for distribution of the electrolyte mentioned above also can be used.

Since the discharge characteristics are improved in this way, the overcharge decreases when charge and discharge are repeated and swelling of the plate can be inhibited. Furthermore, since each active material layer is thinner than the active material layer in the conventional pasted type electrode, the influence caused by swelling of the active material is small, peeling off from the electroconductive substrate is inhibited, and the cycle life in repetition of charge and discharge is improved as compared with conventional pasted type electrodes.

EXAMPLE 1

Figure 1:
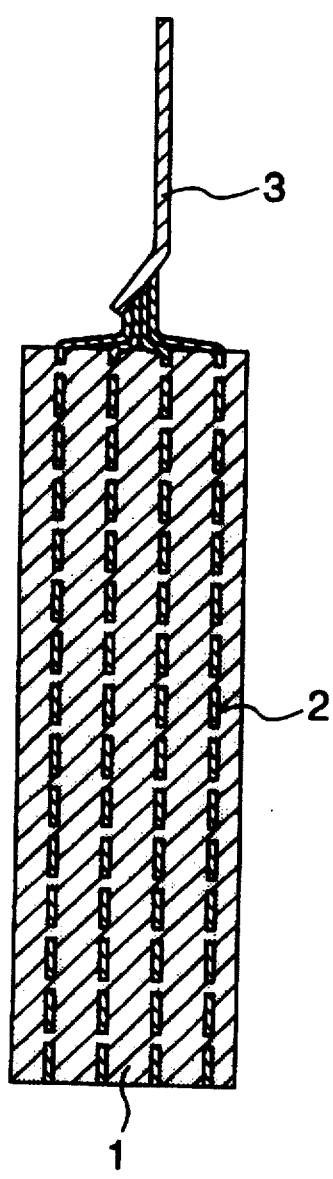
FIG. 1 is a schematic sectional view of nickel plate a in the example of the present invention.
Figure 2:
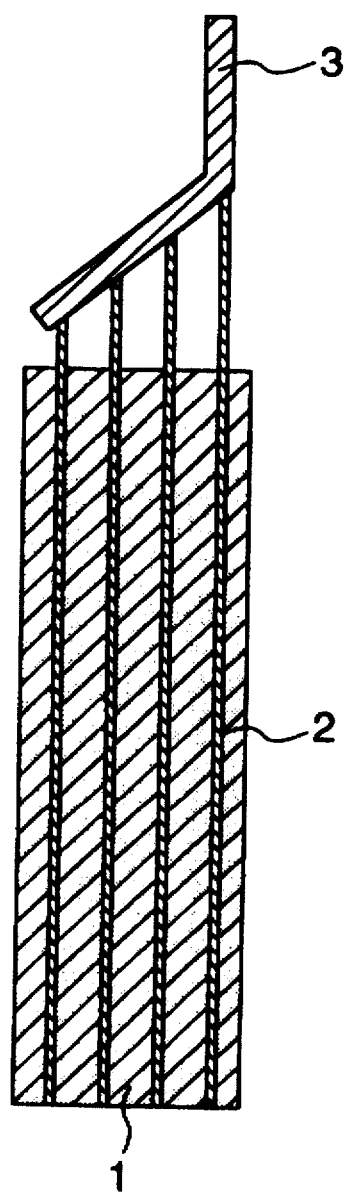
FIG. 2 is a sectional view which schematically shows the electrical connection of electrode leaves of the present invention.

Nickel foils having holes of 0.5 mm in diameter at an opening percentage of 20%, and having a thickness of 15 μm and a width of 35.5, 36.0, 36.5 and 37.0 mm were used as the electroconductive substrates. Both sides of the electroconductive substrates were coated at a thickness of 200 μm with an active material paste of 20% in water content which was prepared by kneading 100 parts by weight of commercially available nickel hydroxide powder, 8 parts by weight of cobalt oxide powder, 15 parts by weight of 3 wt % aqueous solution of carboxymethylcellulose, and 5 parts by weight of polytetrafluoroethylene dispersion (solid content 48%). The width of active material paste (1) coated was 35 mm, and a portion which was not coated with the active material was provided at one end of each electroconductive substrate (2). The thus coated electroconductive substrates were laminated with the lower ends coated with the active material being assembled evenly and flat as shown in FIG. 1. The laminate was dried at 90° C., and, then was pressed so that the total thickness of the plate reached 0.7 mm, thereby to bond the respective layers. Thereafter, an Ni ribbon of 4 mm wide was welded to the portion of each electroconductive substrate which was not coated with the active material to form a current collector (3). The thus obtained plate was called "plate A". FIG. 1 shows a sectional view of this plate A.

EXAMPLE 2

Both sides of polypropylene films having holes of 0.5 mm in diameter at an opening percentage of 15% and having a thickness of 10 μm and a width of 35.5, 36.0, 36.5 and 37.0 mm were coated with metallic nickel by vapor deposition to obtain an electroconductive substrate. The thickness of the nickel layer is 2.5 μm. Then, plate B was made in the same manner as in making the plate A. In this example, a polypropylene film was used, but any resin films of polyethylene, nylon, polytetrafluoroethylene, etc. which are stable in an alkali solution can also be used. The synthetic resin film can be coated with nickel by electroplating or chemical plating in place of the vapor deposition to obtain the similar electroconductive substrate.

EXAMPLES 3 and 4

Plates C and D were made in the same manner as in EXAMPLES 1 and 2, except for using a nickel-plated punching metal of 36.0 mm wide in place of the nickel foil and nickel-coated polypropylene film of 36.0 mm wide. That is, the plates C and D corresponded to the plates A and B in which a thicker nickel-plated iron punching metal was inserted at the central part, respectively. The nickel-plated punching metal used had holes of 1 mm in diameter at an opening percentage of 50% and had a thickness of 50 μm and a width of 36.0 mm.

EXAMPLE 5

Holes of 1 mm in diameter were bored at an opening percentage of 1% through the plate B. A conductive paste prepared by kneading 70 parts of nickel powder and 30 parts of a 10% aqueous carboxymethylcellulose solution was filled into the holes to make plate E. As a conductive paste 8, a mixture of Ni powder and epoxy resin may be used, and, furthermore, an Ni pin which is a conductor may also be used.

Then, batteries were fabricated using the plate B, the plate D and the plate E and evaluated on their characteristics.

Figure 5:
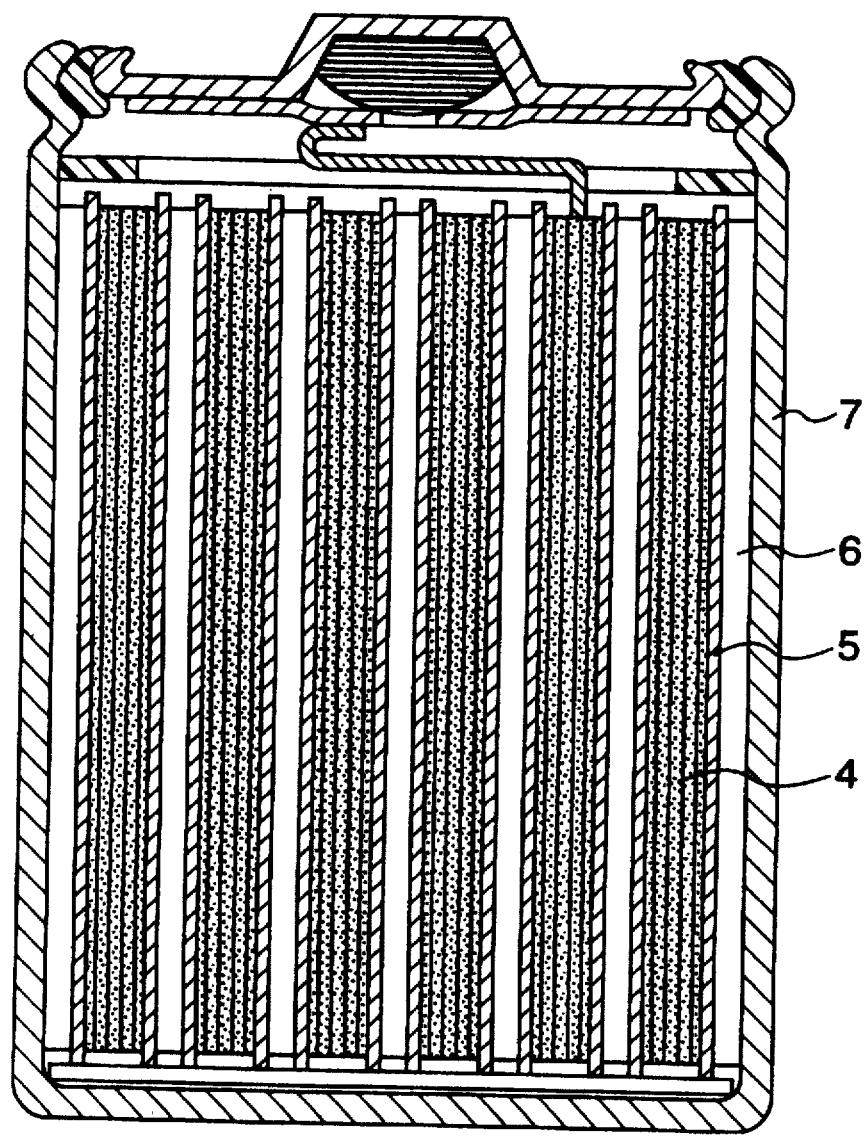
FIG. 5 is a schematic sectional view of battery B in the example of the present invention.

Each plate was cut to a length of 85 mm and this was used as positive plate 4. Moreover, negative plate 6 was made in the following manner. $MmNi_{3.7}Mn_{0.4}Al_{0.3}Co_{0.6}$ which is an $MmNi_5$ based hydrogen-storing alloy was ground and thereto was added a 1.5 wt % aqueous carboxymethylcellulose solution to prepare a paste. The paste was charged in a foamed nickel sheet having a porosity of 95% and a thickness of 0.8 mm, followed by pressing it to a thickness of 0.4 mm to make an electrode. A 5% fluororesin dispersion was applied to the surface of the electrode. This pasted type hydrogen-storing alloy electrode was cut to 35 mm wide and 120 mm long, to which a lead plate was attached by spot welding. This negative plate 6 and the plate B, the plate D or the plate E between which a polypropylene nonwoven fabric separator subjected to hydrophilic treatment was inserted were rolled into a spiral and this was contained in case 7 to form a sealed nickel-hydrogen storage battery, which was filled with an electrolyte prepared by dissolving 30 g/l of lithium hydroxide in an aqueous potassium hydroxide solution having a specific gravity of 1.30. In this way, 4/5A type batteries B, D, and E of 1400 mAh in nominal capacity corresponding to the plates b, d and e, respectively were fabricated. FIG. 5 shows a sectional view of battery B.

For comparison, battery F was fabricated in the same manner as above, using a nickel electrode made by coating both sides of a punching metal having a thickness of 70 μ and having holes of 2 mm in diameter at an opening percentage of 50% as an electroconductive substrate with the same active material as in EXAMPLE 1 at a thickness of 1500 μm and pressing it to a total thickness of 0.7 mm.

The batteries B, D, E and F were subjected to the conventional formation and, then, evaluated on discharge characteristics. They were charged at 0.2 CmA for 6 hours and, then, discharged at 0.2, 1, and 3 CmA to 1.0 V. The results are shown in TABLE 1.

TABLE 1

| Battery | Discharging condition | Active material utilization (Discharge voltage) | | | Capacity density |
|---|---|---|---|---|---|
| | | 0.2 CmA | 1.0 CmA | 3.0 CmA | mAh/cc |
| B | | 97.7% (1.25 V) | 90.9% (1.18 V) | 73.3% (1.10 V) | 630 |
| D | | 98.4% (1.25 V) | 92.0% (1.20 V) | 75.2% (1.13 V) | 600 |
| E | | 96.8% (1.25 V) | 91.3% (1.19 V) | 74.3% (1.12 V) | 620 |
| F (Comparative) | | 88.8% (1.20 V) | 70.3% (1.15 V) | 49.6% (1.05 V) | 640 |

From the above results, it can be seen that batteries B, D and E were superior to battery F in active material utilization and discharge voltage. Especially, the discharge voltage at a high rate discharge was high in batteries D and E.

Next, batteries B, D, E and F were subjected to a cycle life test of carrying out the charging at 0.5 CmA at room temperature for 3 hours and the discharging at 1 CmA to 0.9 V. The cycle number required for the discharge capacity reaching 60% of the initial capacity is shown in TABLE 2.

TABLE 2

| Battery | Cycle number | | |
|---|---|---|---|
| B | 525 | 530 | 534 |
| D | 587 | 590 | 572 |
| E | 550 | 548 | 541 |
| F | 203 | 165 | 186 |

TABLE 2-continued

| Battery | Cycle number |
| --- | --- |
| (Comparative) | |

From the results, it can be seen that the cycle life of batteries B, D and E was markedly prolonged than battery F.

In this EXAMPLE, a hydrogen-storing alloy was used for the negative electrode, but the battery characteristics are similarly improved by using a cadmium electrode, an iron electrode and a zinc electrode as the negative electrode.

As mentioned above, the nickel electrode of the alkaline storage batteries according to the present invention has the structure comprising a plurality of active material layers each having a thickness of 20–250 μm and a plurality of electroconductive substrates each having a thickness of 5–60 μm which are alternated with each other and integrated, and the electroconductive substrates are electrically and mechanically connected through a part of the respective electroconductive substrates. Therefore, pasted type nickel electrodes excellent in active material utilization, discharge voltage characteristics and charge-discharge repetition characteristics are obtained.

What is claimed is:

1. An alkaline storage battery comprising a nickel positive electrode, a negative electrode and an alkaline electrolyte, wherein said nickel positive electrode comprises a plurality of electrode leaves each of which comprises an electroconductive substrate coated with an active material and which are laminated and integrated so that the electroconductive substrate and the active material layer are alternated with each other, a plurality of said electroconductive substrates being electrically and mechanically connected through a part of the respective electroconductive substrates, said electroconductive substrate having a thickness of 5–60 μm, said active material layer coated on the electroconductive substrate having a thickness of 20–250 μm.

2. An alkaline storage battery according to claim 1, wherein among a plurality of the electroconductive substrates connected with each other through a part thereof, at least one of them is thicker than others.

3. An alkaline storage battery according to claim 2, wherein the thickness of the thicker electroconductive substrate is 3–10 times that of other electroconductive substrate and is position around the center of the nickel positive electrode.

4. An alkaline storage battery according to claim 1, wherein each electroconductive substrate has holes of 0.1–1 mm in diameter, said holes comprising 10–60% of a surface area of said each substrate.

5. An alkaline storage battery according to claim 1, wherein the electroconductive substrate comprises a nickel foil of 2–5 μm thick, a synthetic resin film or a nickel perforated steel sheet coated on both sides with nickel of 2–5 μm thick.

\* \* \* \* \*